United States Patent
Carroll et al.

(10) Patent No.: US 8,799,299 B2
(45) Date of Patent: Aug. 5, 2014

(54) SCHEMA CONTRACTS FOR DATA INTEGRATION

(75) Inventors: Matthew Carroll, Seattle, WA (US); David Noor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/788,310

(22) Filed: May 27, 2010

(65) Prior Publication Data

US 2011/0295865 A1 Dec. 1, 2011

(51) Int. Cl.
*G06F 17/30* (2006.01)
(52) U.S. Cl.
USPC .......................................... 707/756; 707/760
(58) Field of Classification Search
CPC ............. G06F 17/30604; G06F 17/30297; G06F 17/30392; G06F 8/427
USPC ............................................... 707/756, 760
See application file for complete search history.

(56) References Cited

U.S. PATENT DOCUMENTS

| | | | |
|---|---|---|---|
| 6,263,492 B1 | 7/2001 | Fraley et al. | |
| 7,000,238 B2 | 2/2006 | Nadler et al. | |
| 7,653,652 B2 | 1/2010 | Kagalwala et al. | |
| 8,103,704 B2* | 1/2012 | Abrams | 707/809 |
| 2004/0002983 A1* | 1/2004 | Ashida et al. | 707/100 |
| 2004/0003341 A1* | 1/2004 | alSafadi et al. | 715/500 |
| 2004/0083199 A1* | 4/2004 | Govindugari et al. | 707/1 |
| 2004/0158567 A1* | 8/2004 | Dettinger et al. | 707/100 |
| 2005/0102303 A1* | 5/2005 | Russell et al. | 707/101 |
| 2005/0177585 A1* | 8/2005 | Venkatesh et al. | 707/100 |
| 2005/0228728 A1* | 10/2005 | Stromquist | 705/30 |
| 2005/0268277 A1 | 12/2005 | Reeder et al. | |
| 2005/0278653 A1 | 12/2005 | Scholz | |
| 2006/0259458 A1* | 11/2006 | Hunter et al. | 707/2 |
| 2007/0005619 A1* | 1/2007 | Ashida et al. | 707/100 |
| 2007/0011175 A1* | 1/2007 | Langseth et al. | 707/100 |
| 2007/0073736 A1 | 3/2007 | Goetz | |
| 2007/0074155 A1* | 3/2007 | Ama et al. | 717/106 |
| 2008/0046462 A1* | 2/2008 | Kaufman et al. | 707/102 |
| 2008/0126161 A1 | 5/2008 | Willis et al. | |
| 2008/0154927 A1* | 6/2008 | Johnson et al. | 707/101 |
| 2009/0037462 A1* | 2/2009 | Pearson et al. | 707/103 Y |

(Continued)

OTHER PUBLICATIONS

Ewald, et al., "A Flexible Model for Data Integration", Retrieved at << http://msdn.microsoft.com/en-us/library/bb245674.aspx >>, Retrieved Date: Mar. 3, 2010, pp. 6.

(Continued)

*Primary Examiner* — Thanh-Ha Dang
(74) *Attorney, Agent, or Firm* — Nicholas Chen; Kate Drakos; Micky Minhas

(57) ABSTRACT

A system and method for extracting data from an input source, transforming the data, and loading the transformed data to an output destination. A schema contract including constraints is used to validate a set of input data column types and translate them into a set of actual types. Mapping data in the schema contract enable mapping input data columns to data columns used by data integration components. The constraints and mapping data provide flexibility in transforming sets of data having different sets of input data column types, while providing a fixed set of types for use during dataflow executions. Flexibility may enable optional columns, sets of one or more columns, varying arrangements of columns, and variations in type definitions of each column.

20 Claims, 11 Drawing Sheets

(56) References Cited

U.S. PATENT DOCUMENTS

| | | |
|---|---|---|
| 2009/0043778 A1 | 2/2009 | Jambunathan et al. |
| 2009/0055439 A1* | 2/2009 | Pai et al. .................. 707/200 |
| 2009/0271158 A1 | 10/2009 | Yeh et al. |
| 2010/0017395 A1* | 1/2010 | Wayn et al. .................. 707/5 |
| 2010/0049728 A1* | 2/2010 | Chiticariu et al. ............ 707/101 |
| 2010/0114935 A1* | 5/2010 | Polo-Malouvier et al. ... 707/769 |
| 2013/0086095 A1* | 4/2013 | Barton .................. 707/758 |

OTHER PUBLICATIONS

International Search Report and Written Opinion of the International Searching Authority mailed Jan. 18, 2012 for PCT/US2011/038227 (9 pgs).

Australian Exam Report in Application 2011258098, mailed Mar. 4, 2014, 3 pgs.

\* cited by examiner

SCHEMA CONTRACTS FOR DATA INTEGRATION

BACKGROUND

A relational database typically includes one or more tables. Each table has one or more records, and each record of a table has one or more fields. The records of a table are referred to as rows, and the fields are referred to as columns. Each column has associated metadata that describes the type, size, or other properties of the data in the field for each record. A schema includes the metadata for each column of each table, as well as other specifications of each table, such as a sort field, keys, or the like.

An extract, translate, and load system (ETL) is a computer-based system that extracts data from a specified data source, transforms the data to convert it into a desired state, and loads the transformed data to a specified destination. ETL systems may be used in a variety of environments. For example, a heterogeneous system may have some data stored in a first format, schema, or arrangement, and other parts of the system that use a different format, schema, or arrangement. An ETL system may be used to integrate the two subsystems. Transformations may include operations such as reformatting, sorting, filtering, combining data columns, or other types of modifications. Each of the input data and output data of an ETL system has a schema. The output schema may be the same or differ from the input schema.

The input and output schemas employed by an ETL are typically fixed. In order to accommodate changes in the schemas, a developer may modify the schemas as desired. In some systems, portions of a schema may be dynamically processed by an ETL. However, the dynamic processes may result in inefficiencies in the implementations of dataflows. For example, memory blocks may not be optimal for the particular dataflow.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to facilitate extracting data from an input source, transforming the data, and loading the transformed data into an output destination. In one embodiment, a schema contract includes constraints that are used to validate a set of input data column types and translate them into a set of actual types. In one embodiment, mapping data in the schema contract enables mapping the input data columns to data columns used by data integration components.

In one embodiment, the mapping data enables specifications of optional columns or sets of one or more columns. Input columns may be arranged in various ways and mapped to the data columns used by the data integration components. Input columns may vary in arrangement, name, or type definitions.

The system enables a schema contract to be reused with different input data sources, where the column type specifications of each input data source differ. An example difference includes variations in a type definition for an input column. For example, corresponding columns from different sources may have string lengths that differ from other sources.

In one embodiment, prior to receiving data of each dataflow, a set of column types is generated, each column type corresponding to a respective input data column associated with the dataflow. The generation may be based on a constraint set of the schema contract and the metadata corresponding to the input data columns.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
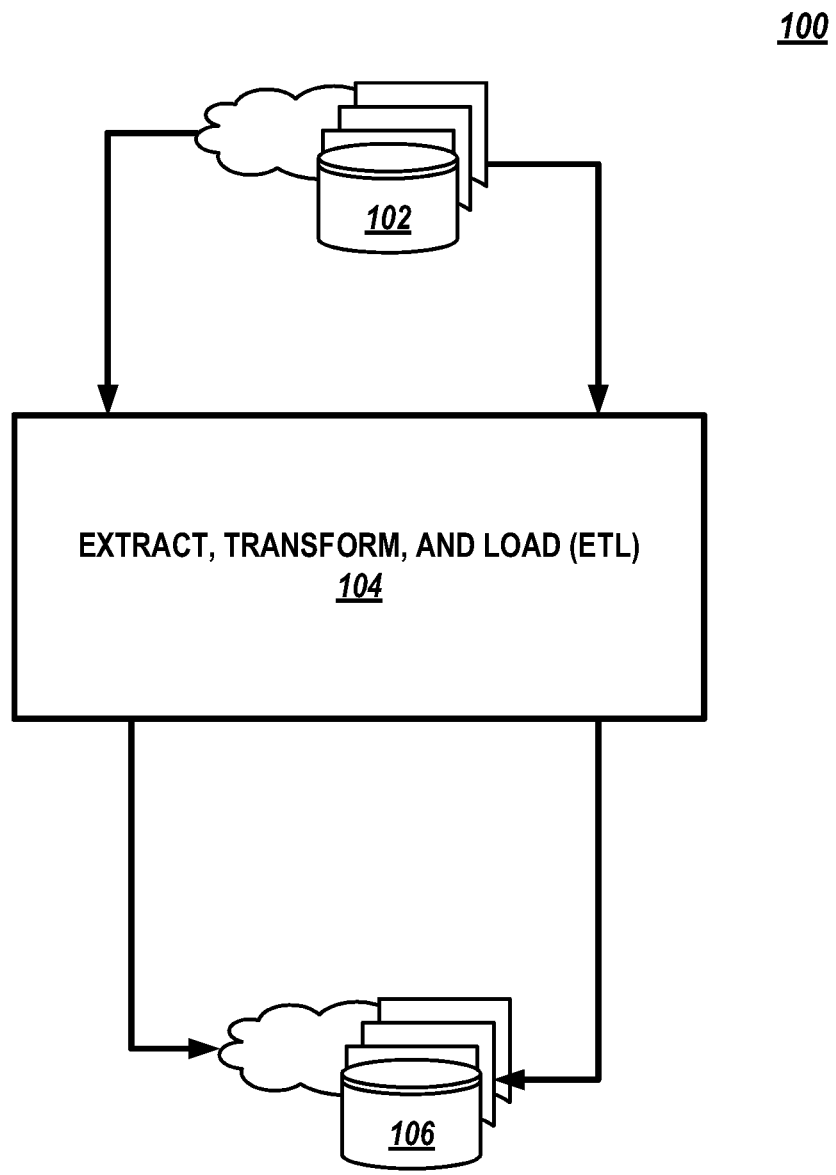
FIG. 1 is a block diagram of a data integration environment in which mechanisms described herein may be deployed.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of an example data integration environment 100 in which mechanisms described herein may be deployed. Embodiments may be deployed in a variety of environments; environment 100 provides one such example. Environment 100 may be a portion of a larger data integration environment.

As illustrated, environment 100 includes input data sources 102. Data sources 102 may include one or more files, databases, memory structures, network resources, data streams, or the like, or combinations thereof. Data sources 102 serve as input to an extract, transform, and load system (ETL) 104. ETL 104 receives data from data sources 102, performs various operations on the data, and provides data output 106. Data output 106 may have the qualities of data sources 102, such as being embodied in files, databases, or the like.

Data sources 102 may have an input schema that provides properties of the various tables and columns contained therein. Data output 106 may have an output schema that provides properties of the various tables and columns contained therein, or more specifically, the columns output by ETL 104. ETL 104 may include a sequence of operations that perform one or more transformations of the input data before providing the data to a destination. Thus data may be said to flow from each input source through the ETL as it proceeds or is transformed.

Some transformations may cause the output schema to differ from the input schema. An example transformation may concatenate two string columns to produce a third column. The input schema may include specifications of two columns that each have strings of length 30. The output schema may replace these two columns with a single column having strings of length 60. Another example transformation may sort the rows of a table, resulting in a schema for each column that is equivalent to the input schema. Numerous configurations and relationships between input schema and output schema are possible.

Figure 2:
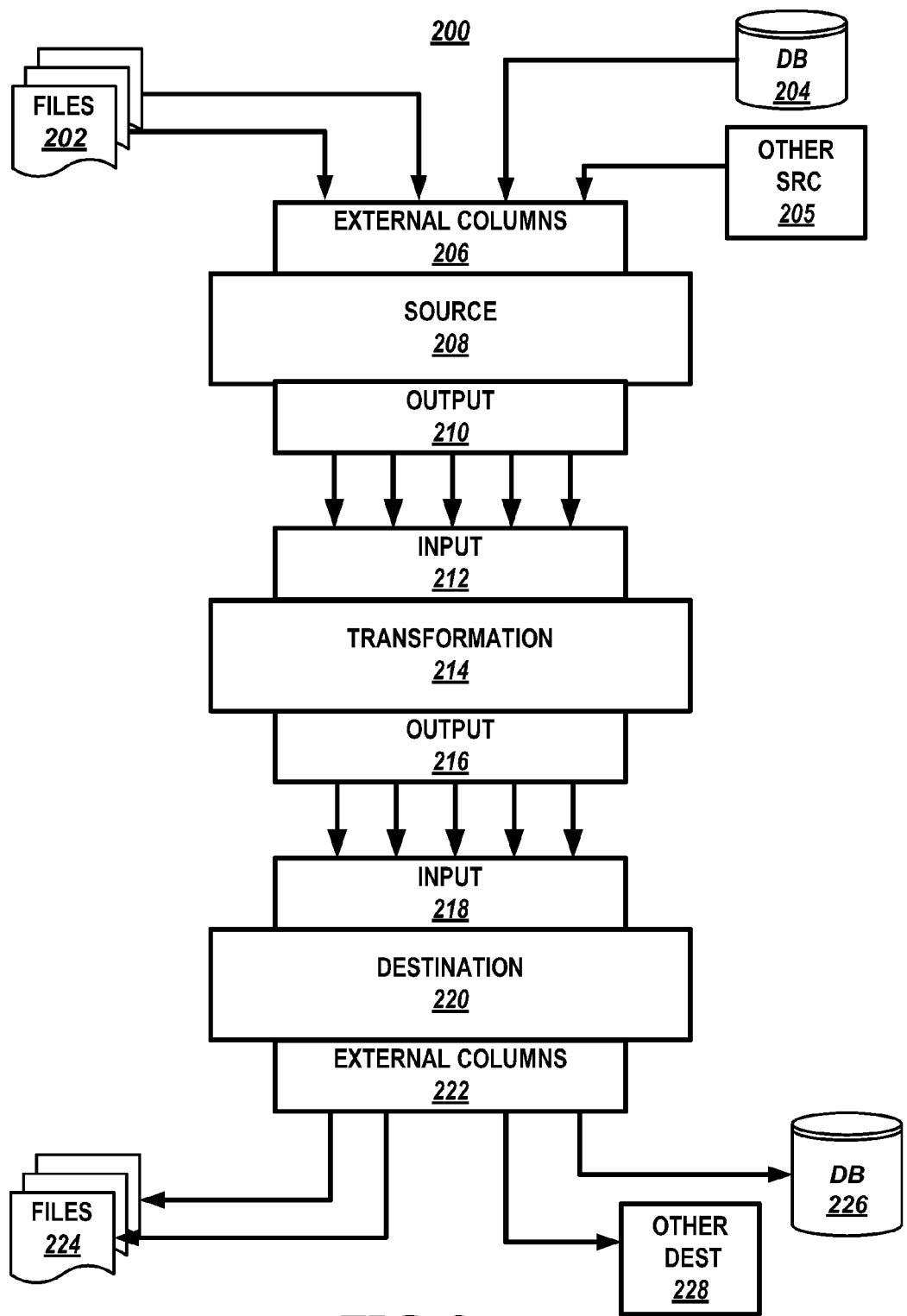
FIG. 2 is a block diagram of an example data integration system in which mechanisms described herein may be deployed.

FIG. 2 is a block diagram of an example data integration system 200 in which mechanisms described herein may be deployed. System 200 illustrates in further detail, aspects of environment 100.

As illustrated, system 200 includes three types of input sources: files 202, database 204, and other source 205. These three types of input sources may represent input data sources 102 of environment 100. System 200 further illustrates three components of an ETL system. Source component 208, transformation component 214, and destination component 220 may be components of ETL 104. In one configuration, source component 208 extracts data from input sources; transformation component 214 may modify, summarize, or otherwise process data received from source component 208; destination component 220 may load output data into output data stores, such as files 224, database 226, or other destination data 228. An ETL system is also referred to herein as a data integration system. Source component 208, transformation component 214, and destination component 220 are referred to as data integration components.

In the illustrated example system 200, each of source component 208, transformation component 214, and destination component 220 has its own input interface and output interface. These are connected with corresponding interfaces or data to form dataflows between data sources 102 and data output 106. As illustrated, external columns interface 206 provides input to source component 208, and receives data from files 202, database 204, or other source 205. Output interface 210 of source component 208 connects with input interface 212 of transformation component 214. Output interface 216 of transformation component 214 connects with input interface 218 of destination component 220. External columns 222 may be an output of destination component 220 that connects with the output sources: files 224, database 226, or other destination data 228.

Source component 208, transformation component 214, and destination component 220 may form a pipeline, in which data is received from a data source, processed by each of these components, and then output to a data output. Operations within the pipeline may be performed concurrently. For example, destination component 220 may be processing data received from transformation component 214 concurrently with transformation component 214 processing data received from source component 208, while source component 208 concurrently processes new data received from a data source. Though FIG. 2 shows a simple configuration, more complex systems may be configured by adding additional instances of source component 208, transformation component 214, or destination component 220 into an ETL system.

In some configurations, source components, transformation components, or destination components may perform functions of other components. For example, a transform component may import data from an external source and combine it with data in memory, thus serving as a combination of a source component and a transform component. In another example, a transform component may write data to an external destination. In some configurations, a source component, transform component, or destination component may have multiple inputs or multiple destinations. This may be used, for example, to combine inputs or to split an input into multiple outputs.

Figure 3:
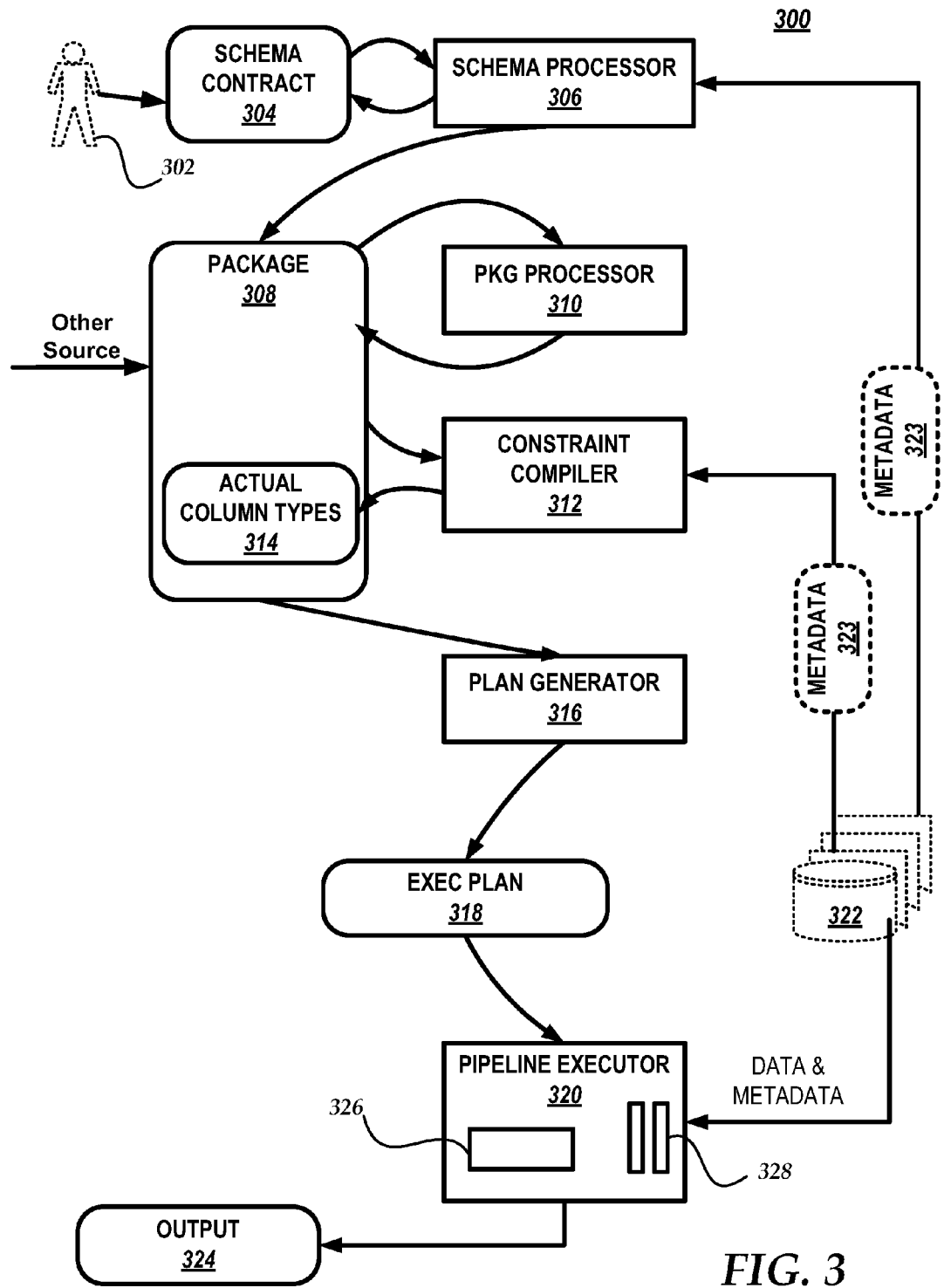
FIG. 3 is a block diagram illustrating an example system that may implement an extract, transform, and load system.

FIG. 3 is a block diagram illustrating an example data integration system 300 that may implement an ETL, such as ETL 104 of FIG. 1. FIG. 3 is only an example of a suitable system configuration and is not intended to suggest any limitation as to the scope of use or functionality of the present invention. Thus, a variety of system configurations may be employed without departing from the scope or spirit of the mechanisms described herein.

The components of system 300 may be distributed among one or more computing devices, each of which may communicate with the others by employing one or more of various wired or wireless communication protocols such as IP, TCP/IP, UDP, HTTP, SSL, TLS, FTP, SMTP, WAP, Bluetooth, WLAN, or the like.

A computing device may be a special purpose or general purpose computing device. Example computing devices include mainframes, servers, blade servers, personal computers, portable computers, communication devices, consumer electronics, or the like. FIG. 9 illustrates an example embodiment of a computing device that may be used to implement system 300 or portions thereof.

FIG. 3 includes user 302 in dashed lines to indicate that user 302 is not a part of system 300, but may interact with the system. In one embodiment, user 302 provides one or more constraints in schema contract 304 to system 300. A schema contract may include a set of constraints, though it may include additional data. A constraint may itself be a type specification. In some embodiments, a constraint may be a generalized type specification. For example, a constraint of String may accommodate string types of various types or lengths. A constraint of integer may accommodate various integer types. In one embodiment, a schema contract includes mapping data for matching input data columns to specifications used by one or more data integration components.

Mapping data may specify a way to process a variable number of columns. For example, a constraint may specify one or more columns of any type, or zero or more columns of any type. Another example constraint may specify one or more columns of strings. A constraint may specify a single optional column, along with a type constraint and a default value. If an optional input column is omitted, the default value and type constraint may be inserted into the dataflow.

Some mapping data may provide specifications to enable mapping between input columns and columns to be processed by a data integration component, while preserving semantic information of the columns. For example, a mapping mechanism may specify a column by name. If the corresponding column is in a different position relative to other columns than that expected by a data integration component, it may be mapped by a column name specification. In some embodiments, a name specification may be generalized, such as by the use of wild card characters or other mechanisms to match input column names. For example, a constraint may specify one or more string columns named "AB*", and map to columns that begin with the characters "AB".

In one implementation, an internal map may provide a correspondence between physical column references and internal references. When a component of the system is changed but provides an equivalent column, the mapping mechanism facilitates automatic re-mapping of each column. In one embodiment, the system may present a user with the semantic context of the expected columns and the actual input columns, and enable the user to indicate a column mapping for one or more columns FIG. 9 provides examples of column mapping.

Constraints in schema contract 304 may exist in any of a number of forms, and may be generated in various ways. In one embodiment, schema processor 306 receives metadata 323 from input source 322, corresponding to input data source 102 of FIG. 1. Input source 322 and metadata 323, shown in dashed lines, may be external to system 300, but are provided as input to the system. Metadata 323 may include actual types of the data received from input source 322. Schema processor 306 may facilitate specifications of a constraint from the actual types. In one embodiment, schema processor 306 may indicate the actual types of each column and enable user 302 to replace the actual types with constraint types in schema contract 304.

In one embodiment, schema processor 306 may perform processing to determine a constraint that may be derived from metadata 323 and be valid for the system. It may, for example, examine downstream component inputs and determine that an actual type may be made into a more general constraint. For example, a downstream input may indicate a specification for a column of a generic string having length 50. A corresponding actual type may specify a Unicode string having a length 30. Schema processor 306 may determine that the actual type may be changed to a constraint of a generic string. Schema processor 306 may present proposed constraint types to user 302 and facilitate acceptance or changing of the proposed types. Constraints may vary in their specificity. Some examples of constraints are: string of length 50; string; number of any precision; any type; optional column; or one or more columns.

In one embodiment, schema processor 306 may analyze constraints in schema contract 304 to determine whether it is valid, based on input or output interfaces of downstream components. In one embodiment, each data integration component may be configured with input constraint specifications. In one embodiment, a validation may be performed by determining whether a data integration component input constraint specification can accommodate a corresponding constraint for a dataflow. For example, a constraint type of a numeric type may be considered invalid if a downstream component specifies an integer type as input for the dataflow. In one embodiment, each data integration component of an ETL may implement an interface that enables schema processor 306 to query its input or output interfaces. In one embodiment, the component interface may provide a data type that is output based on one or more corresponding input data types. The output data type may be used in a subsequent query of a downstream data integration component. This information may be used to validate each type of constraint in schema contract 304.

In one embodiment, schema processor 306 may provide warning or error messages to user 302 to indicate invalid or possibly invalid type specifications. Thus, any number of iterations may be performed by user 302 to produce the constraints in schema contract 304.

In the illustrated embodiment, schema processor 306 may translate schema contract 304 into package 308. In one embodiment, package 308 may be an extensible markup language (XML) file, though various other formats may be used. In one embodiment, package 308 may be in the form of an object model. In one embodiment, a first format, such as XML may be used, which is then translated into a second format, such as an object model.

A package may include control flow specifications and one or more dataflow specifications. Control flow elements may include one or more containers that provide structures, tasks that provide functionality, and precedence constraints that connect the containers and tasks into an ordered control flow. A control flow task may define and execute dataflows that extract data, apply transformations, and load data.

As illustrated in example system 300, package 308 may be received from another source. For example, an XML file may be generated by another process and provided to system 300, without facilitation by schema processor 306. Some implementations may thus allow for receiving package 308 from internal or external processes.

In one embodiment, package processor 310 may receive package 308 and transform it into a form for runtime use. Package processor 310 may perform a design validation on the schema contained within package 308. In one implementation, this validation may be substantially similar to the design validation performed by schema processor 306. In some configurations, the design validation of schema processor 306 may be skipped, such as a configuration in which package 308 is received from another source. Thus, the design validation of package processor 310 may repeat some validations, or it may perform validations that have not been previously performed. It is to be noted that, though schema processor 306 and package processor 310 are illustrated as distinct components for this discussion, in some implementations they may be at least partially combined into one or more components.

In one embodiment, package processor 310 may begin execution of package 308. This may include execution of one or more tasks distinct from workflows. For example, tasks corresponding to package 308 may include sending one or more emails or other messages to designated recipients, transferring one or more files via FTP or another protocol, execution of specified scripts, or other actions. In one implementation, package processor 310 may initiate workflow processes. The workflow processes may include execution of constraint compiler 312.

In one embodiment, constraint compiler 312 receives the constraints specified within package 308 and transforms them into actual column types 314, based on metadata 323 received from input source 322. Metadata 323 may indicate actual types of the corresponding data. In one implementation, constraint compiler 312 may perform a runtime validation of the column constraints specified in package 308, determining whether the various data integration components are configured to process the corresponding types. If the constraints are valid, constraint compiler 312 may generate actual column types 314 based on metadata 323 and package 308. In one implementation, actual column types 314 may be contained within package 308, though in some implementations, it may be distinct from package 308.

As an example, a data integration component such as transformation component 214 may receive a dataflow including a first column having an actual type specification of Unicode String 30, and a second column having an actual type specification of Unicode String 40. The transformation component 214 may have a constraint specifying a string input. The system may determine that the transform component is to have an output type specification of Unicode String 70, based on an operation of concatenating the two columns.

Actual column types 314 includes a type specification for each input type to be received from input source 322. In one embodiment, constraint compiler 312 may determine actual column types for each input column to each data integration component, and include this information in actual column types 314. Thus, input column specifications corresponding to external columns 206, input interface 212, or input interface 218 may be determined and included.

It is to be noted that a package 308 created by the system as described herein based on a first input source 322 may be used to process a second input source 322. The second input source 322 may have columns with different types than the first input source 322. When executing the second input source 322, the actual column types 314 may be the same or may differ from the actual column types generated when processing the first input source 322.

In one embodiment, plan generator 316 may receive package 308, including actual column types 314, and generate an execution plan 318 based on the package 308 and the actual column types 314. An execution plan 318 may contain specifications of table dimensions, memory blocks to be allocated, a number of threads to employ and relationships between threads, processes to be invoked and timings of processes, one or more graphs of workflows, or other such data. The execution plan 318 may serve as a blueprint for workflow execution. It may be used by any one or more data integration components. In one implementation, the execution plan 318 is generated prior to receiving data from input source 322. It may remain fixed during the execution of the workflows. Having a fixed execution plan provides operational efficiencies that may improve performance, reduce resource usage, or provide other benefits.

In one embodiment, pipeline executor 320 may receive execution plan 318 and allocate resources such as memory 326, threads 328, data structures, objects, or the like. Pipeline executor 320 may initiate or manage execution of workflows by the various components, such as source component 208, transformation component 214, or destination component 220. Output 324 may be produced by the pipeline execution. Output 324 may include data output 106. It may also include data presented to a user, such as status data, messages, or the like. In one embodiment, each data integration component implements an interface that facilitates mechanisms described herein. Specifically, a data integration component may receive a method invocation that specifies one or more columns of actual types for execution. Changes to output columns may be tracked and propagated to downstream components.

Figure 4:
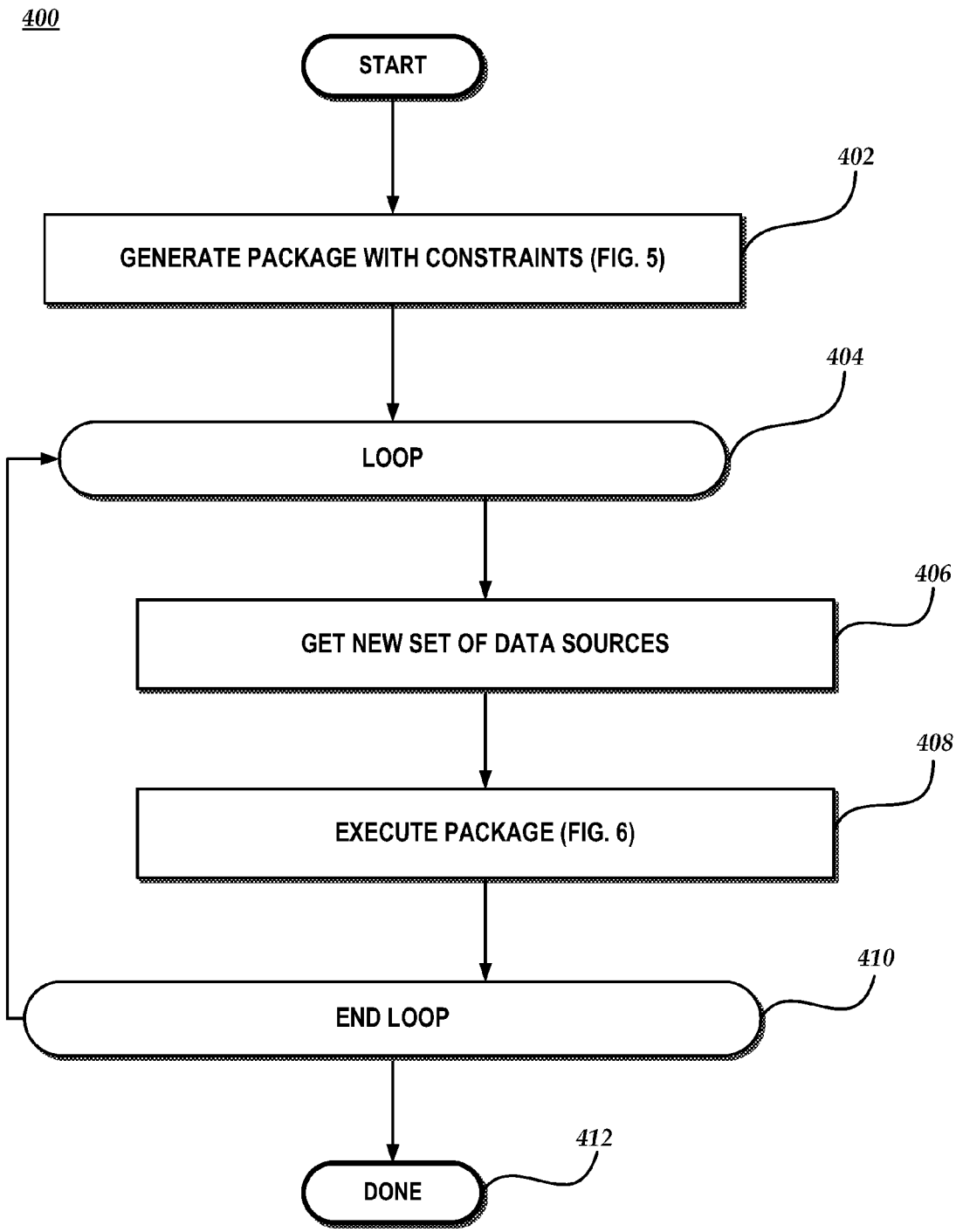
FIG. 4 is a flow diagram illustrating an example embodiment of a process for facilitating flexible constraint specifications in a data integration system.

FIG. 4 is a flow diagram illustrating an example embodiment of a process 400 for facilitating schema contracts in a data integration system. In one embodiment, at least some of the actions of process 400 are performed by components of system 300 of FIG. 3.

The illustrated portions of process 400 may be initiated at block 402, where a package may be generated, the package including one or more flexible constraints or mapping data. Package 308 is an example of such a package. The actions of block 402 are illustrated and discussed in more detail in FIG. 5 and the associated discussion. The process may flow to loop 404, which iterates for each set of input sources and corresponding execution. As discussed herein, a package generated by the mechanisms described herein may be reused with one or more sets of input sources that have different metadata, including one or more different column types. Each iteration of loop 404 corresponds to a data integration execution and a corresponding set of input sources. In the illustrated embodiment, loop 404 includes blocks 406-408, and is terminated by block 410.

Figure 6:
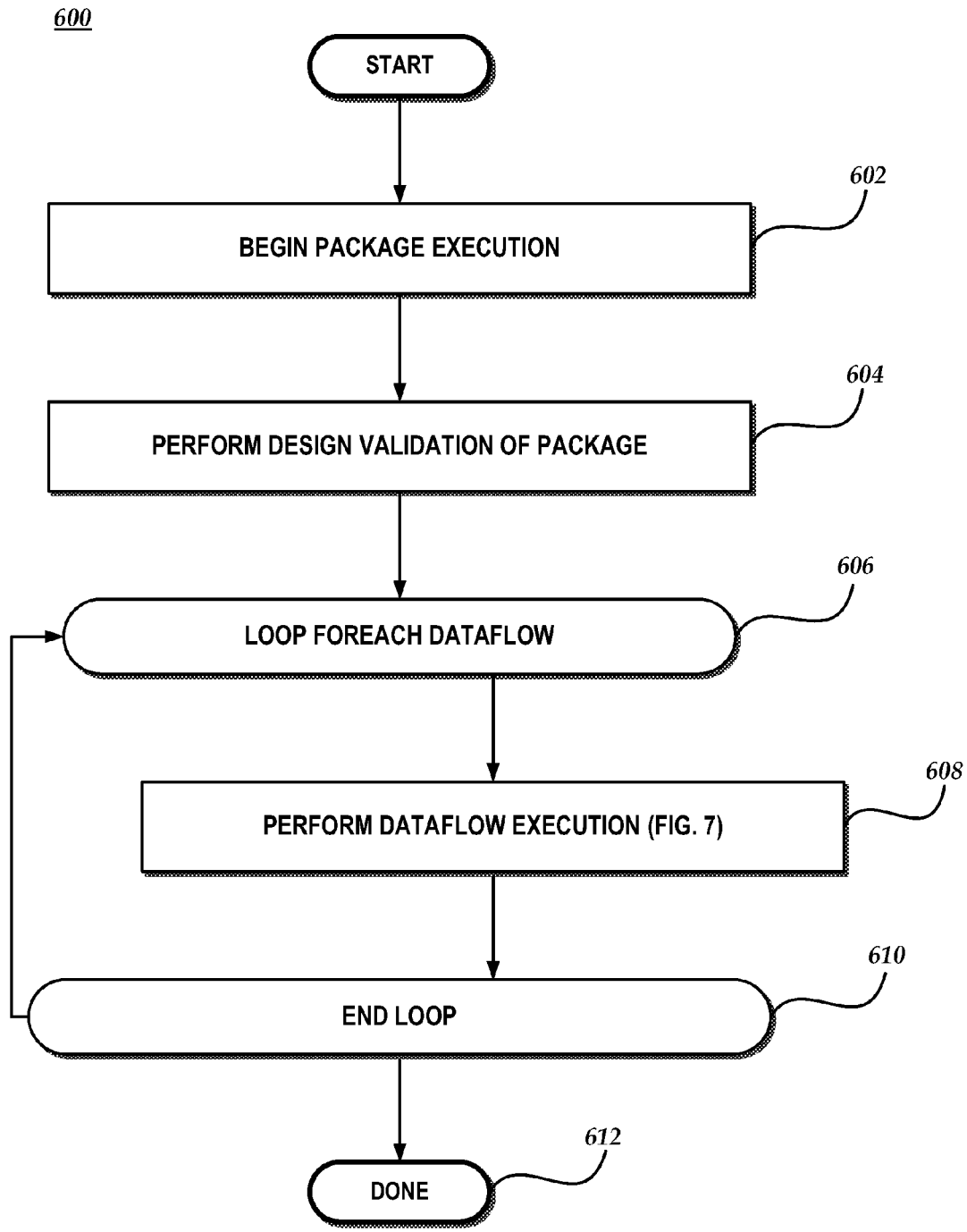
FIG. 6 is a flow diagram illustrating an example embodiment of a process for executing a package that includes constraint specifications.

The process may flow to block 406, where a new set of input data sources is retrieved. The process may flow to block 408, where the current package is executed. FIG. 6 illustrates an example embodiment of a process for executing a package.

The process may flow to block 410 and selectively perform another iteration of loop 404, based on a system configuration or controlling actions by a user. Upon exiting loop 404, the process may flow to done block 412, and exit or return to a calling program.

Figure 5:
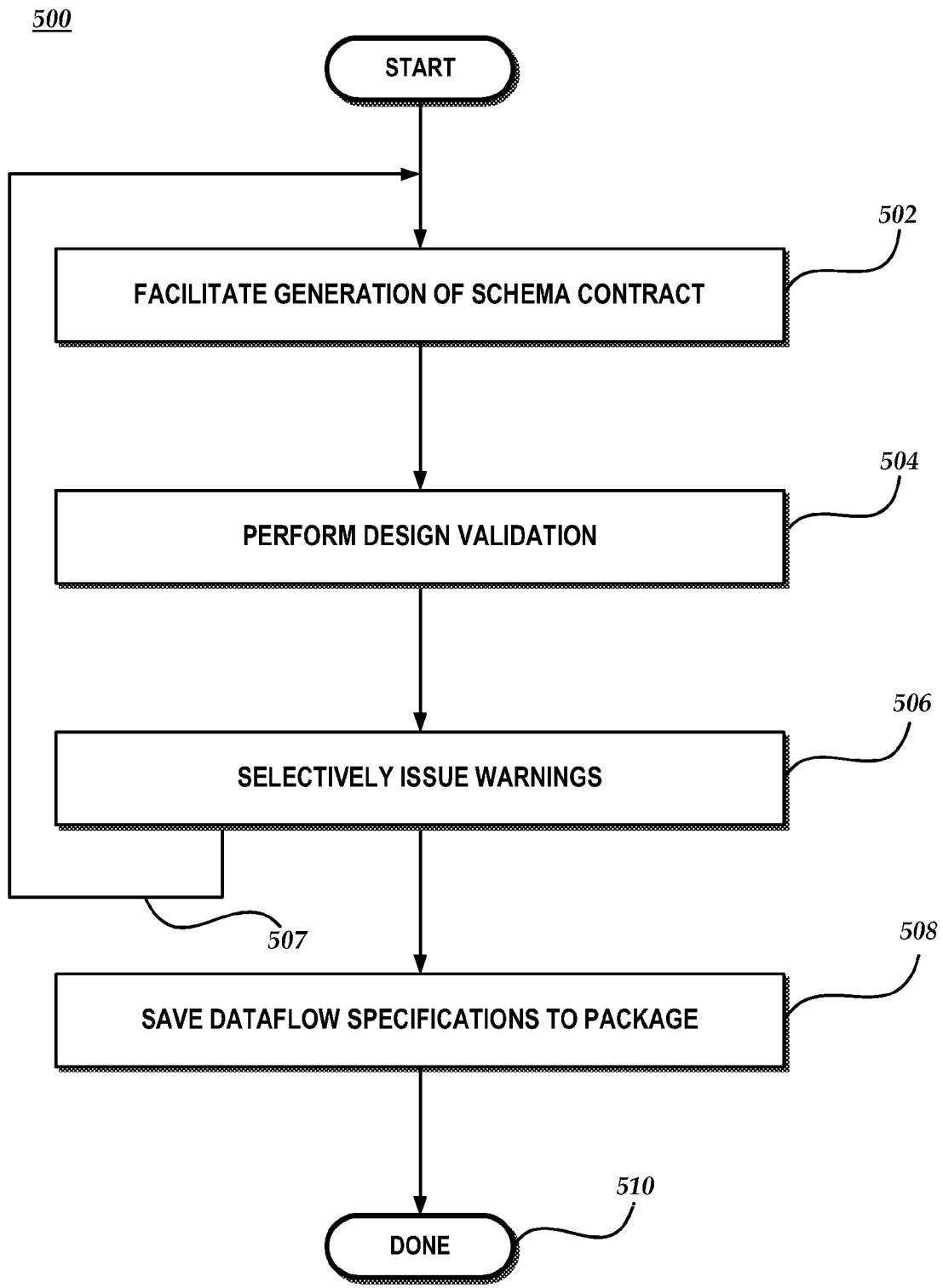
FIG. 5 is a flow diagram illustrating an example embodiment of a process for generating a package that includes constraint specifications.

FIG. 5 is a flow diagram illustrating an example embodiment of a process 500 for generating a package that includes constraint specifications or mapping data, such as package 308 of FIG. 3. Process 500, or a variation thereof, may perform at least some of the actions of block 402, of FIG. 4. The illustrated portions of process 500 may be initiated at block 502, where the system facilitates generation of a schema contract. As discussed herein, a system component, such as schema processor 306, may perform actions such as retrieving metadata from an input source, analyzing the metadata, and enabling a user to transform actual schema to a set of constraints. This may include automatically modifying at least some type specifications to corresponding constraint specifications. It may include presenting specifications to a user and receiving commands to modify the specifications.

The process may flow to block 504, where a design validation may be performed, based on the schema contract and a configuration of data integration system components, such as source component 208, transformation component 214, and destination component 220. The process may flow to block 506, where warnings or error messages are selectively issued, based on the design validation.

As illustrated by arrow 507, in some embodiments, the process may flow back to block 502, to perform additional facilitation of the constraint generation. Blocks 502, 504, and 506 may be part of an iterative process, in which a user generates and modifies one or more constraints or mapping data.

The process may flow from block 506 to block 508, where dataflow specifications are saved to a package, the dataflow specifications including one or more constraint specifications or mapping data. The process may flow to done block 510, and exit or return to a calling program, such as process 400.

FIG. 6 is a flow diagram illustrating an example embodiment of a process 600 for executing a package that includes constraint specifications or mapping data. Process 600, or a variation thereof, may perform at least some of the actions of block 408, of FIG. 4. The illustrated portions of process 600 may be initiated at block 602, where the package execution may begin. This may include initiation of various actions as specified in the package, such as execution of scripts or the like. The process may flow to block 604, where a design validation of the package may be performed. Though not illustrated in FIG. 6, in one embodiment if an error is found, the process may exit or prompt a user for a command.

The process may flow to loop 606, which iterates for each dataflow specified in the package. A package may include one or more dataflow specifications. Depending on the configuration and system capabilities, the execution of some dataflows may be performed concurrently. Some dataflows may depend on other dataflows and be performed sequentially. There may be a combination of concurrent execution and sequential execution for some dataflows. Though loop 606 is illustrated as a sequential loop, it is to be understood that the multiple iterations of loop 606 may be performed at least partially concurrently. In each iteration, the corresponding dataflow is referred to as the current dataflow.

Figure 7:
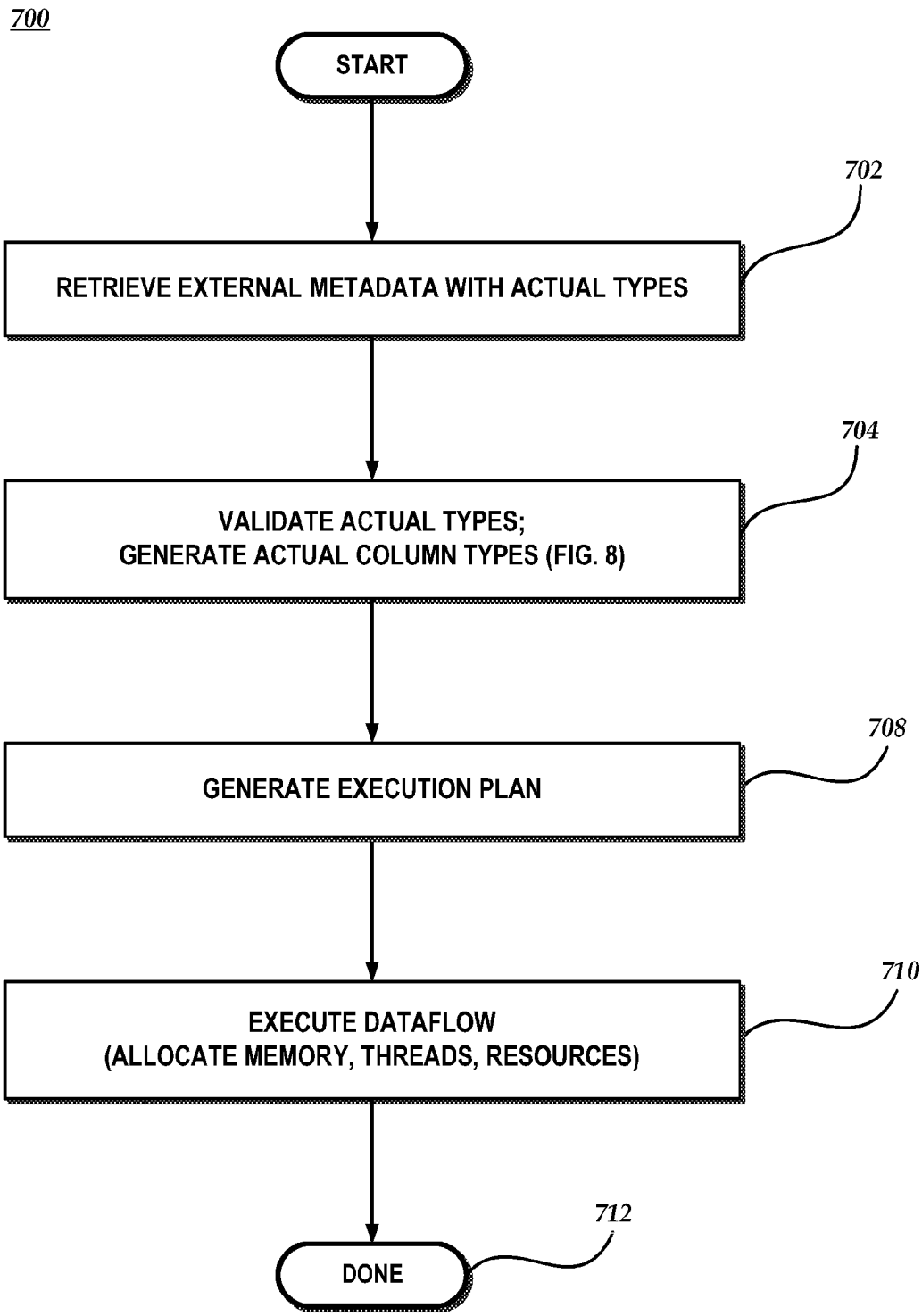
FIG. 7 is a flow diagram illustrating an example embodiment of a process for executing a dataflow.

The process may flow to block 608, where the current dataflow is executed. FIG. 7 illustrates an example embodiment of a process for executing a dataflow. The process may flow to block 610, and selectively perform another iteration of loop 606, based on a system configuration or controlling actions by a user. Upon exiting loop 606, the process may flow to done block 612, and exit or return to a calling program, such as process 500.

FIG. 7 is a flow diagram illustrating an example embodiment of a process 700 for executing a dataflow. Process 700, or a variation thereof, may perform at least some of the actions of block 608, of FIG. 6. In one embodiment, at least a portion of the actions of process 700 may be performed or managed by pipeline executor 320 of FIG. 3. The illustrated portions of process 700 may be initiated at block 702, where external metadata, such as metadata 323 of FIG. 3, is retrieved from a data source, such as input source 322. This metadata may include the actual types of data in each column from the data source.

Figure 8:
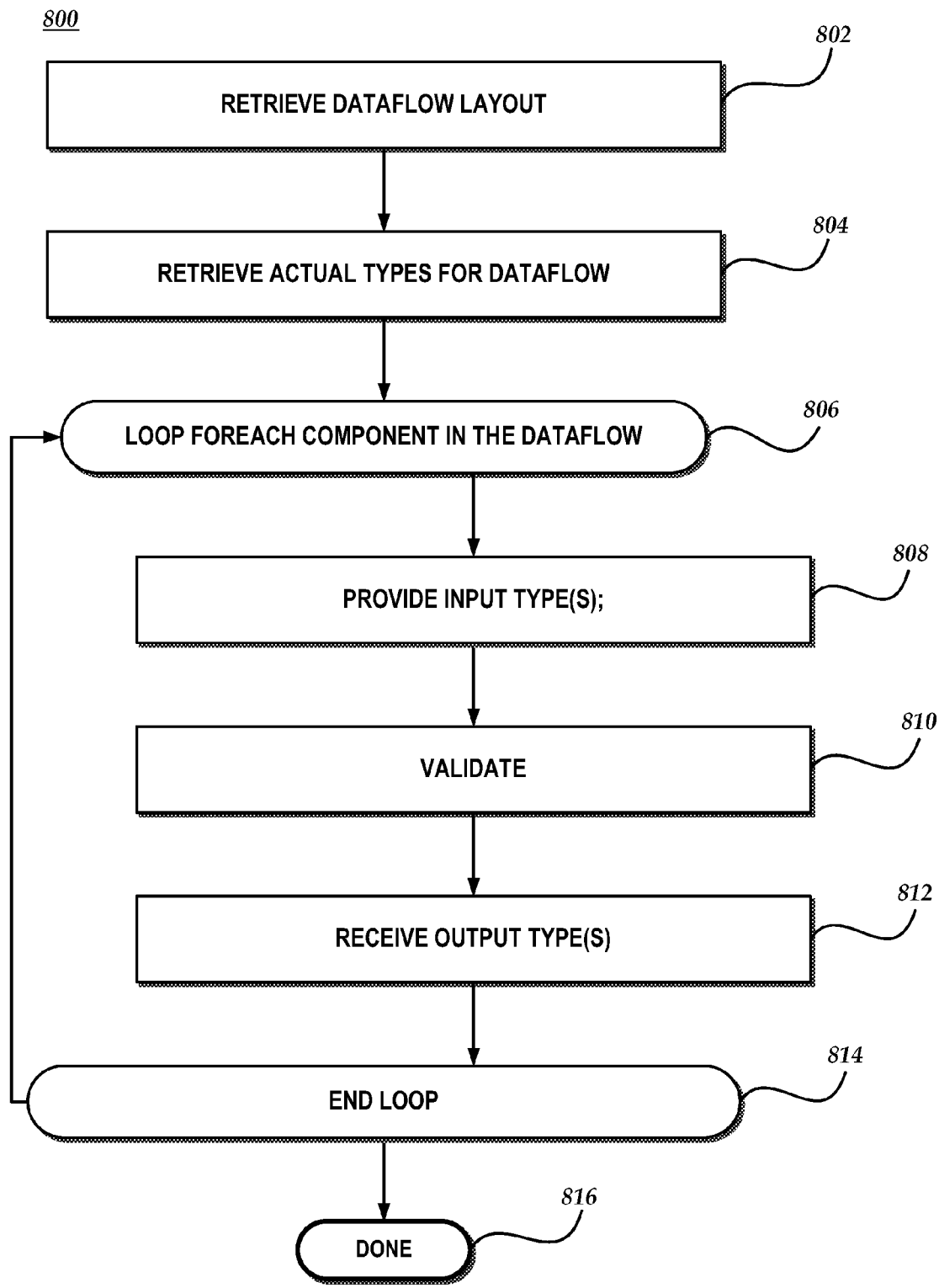
FIG. 8 is a flow diagram illustrating an example process of performing a runtime validation of actual data types.

The process may flow to block 704, where the actual types corresponding to the current dataflow are validated, and actual data types are generated. In one embodiment, a process of performing a runtime validation of actual types may query each data integration component that receives the dataflow to validate each input type and specify a corresponding output type. The corresponding output type may then be provided as input to the next downstream data integration component. If the validation is successful, the actions of block 704 may generate actual column types for the input of each data integration component. The actual column types may therefore be determined based on the metadata or responses from a component query process. FIG. 8 illustrates an example process of validating a dataflow and generating actual column types at runtime.

The process may flow to block 708, where an execution plan is generated based on the actual column types. In some embodiments, an execution plan may specify sizes of memory blocks to be allocated, a sequence of operations, a number of execution threads to allocate, a distribution of processes among the execution threads, other resources to be allocated or deallocated, or other actions that are to be performed as part of a dataflow execution. The execution plan serves as a blueprint for the subsequent execution. In one embodiment, the actions of blocks 704 and 708, including generating actual column types and generating an execution plan, are performed prior to receiving data of the corresponding dataflow.

The process may flow to block 710, where execution of the dataflow is performed. This may include retrieval of data from an input data source, allocation of memory, threads, or other resources, scheduling and execution of various processes, or the like. The process may flow to done block 712, and exit or return to a calling program, such as process 600.

FIG. 8 is a flow diagram illustrating an example process 800 of performing a runtime generation and validation of actual data types. Process 800, or a variation thereof, may perform at least some of the actions of block 704, of FIG. 7. The illustrated portions of process 800 may be initiated at block 802, where a dataflow layout is retrieved. The dataflow layout may specify the sequence of components that make up the dataflow, as well as other information.

The process may flow to block 804, where actual data types corresponding to a current input source are retrieved. They may, for example, be received as part of metadata 323 of FIG. 3. The process may flow to loop 806, which loops for each data integration component of the dataflow in the order of the dataflow. Loop 806 includes blocks 808-812, and is terminated by block 814. The data integration component of each iteration is referred to as the current component. The sequence of iterations and the current component may be based on the dataflow layout retrieved at block 802.

The process may flow to block 808, where one or more input types are provided to the current component. For example, if a current component receives two data columns, the system may provide to the component the actual data types of each data column. The process may flow to block 810, where the current component may validate the actual input data types, based on its configuration. If the component is not able to correctly process the input date types, it may return a status of invalid. Though not illustrated, in some implementations, if a status of invalid is returned, loop 806 may exit and the process may exit.

The process may flow to block 812, where one or more output data types may be retrieved from the current component. The current component may determine any output types that are based on the input types, and return these output types. As discussed herein, the number of output columns may differ from the number of input columns. The returned output types may then be provided as input types in a subsequent iteration of loop 806 with a subsequent component that is to receive one or more of these output types as its input types.

In one implementation, each data integration component of a dataflow may implement an interface including a method that receives one or more input types and returns one or more output types, as well as a validation status. Thus, actions of blocks 808, 810, and 812 may employ this interface in some implementations. In various implementations, other interfaces or mechanisms may be used to perform the actions of blocks 808-812 and to control interactions among the data integration components and pipeline executor 320.

The process may flow to block 814, and selectively perform another iteration of loop 806, based on a system configuration, a status of each validation, or controlling actions by a user. Loop 806 may be repeated with each downstream component of a dataflow. Upon exiting loop 806, the process may flow to done block 816, and exit or return to a calling program, such as process 700.

In an example of a runtime validation, a transformation component may be configured to receive two input string columns and output a concatenated string column. The length of the concatenated string column is dependent on the lengths of the input columns. Each of the input string columns may have a constraint of a string type without a specified length. A destination component that receives input from this transformation component may be specified to receive strings no longer than 60 characters. A runtime validation by constraint compiler 312 may receive metadata that indicates a first input string has an actual length of 40, and a second input string has an actual length of 15. A transformation component may indicate that the input types are valid, and an output column type of a string with length 55. A subsequent query to a downstream data integration component may indicate an input column with a string type of length 55.

Using the same example, another source input using the same constraints may provide metadata that indicates a first input string column has a length of 40 and a second input string column has a length of 30. The transformation component may indicate that the combination of input columns is invalid, because the combined length would exceed its limit of 60. A user may then reconfigure the system, or otherwise perform modifications as desired. Thus, the flexibility of the design type specifications enables variation in the input source types, though it may result in runtime invalidity for some configurations.

Figure 9A:
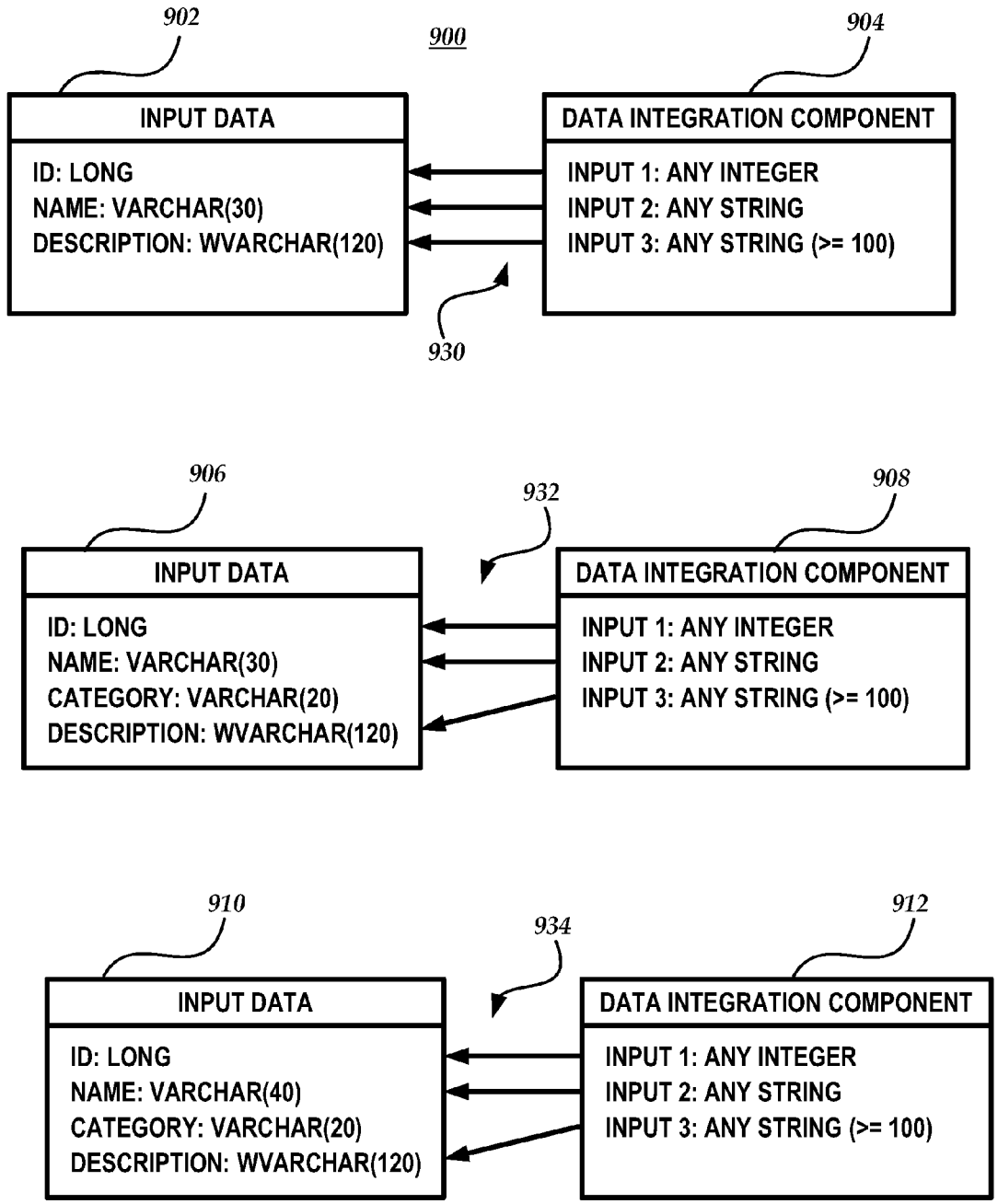
FIGS. 9A-B illustrate examples of mappings between constraint specifications and physical input sources.
Figure 9B:
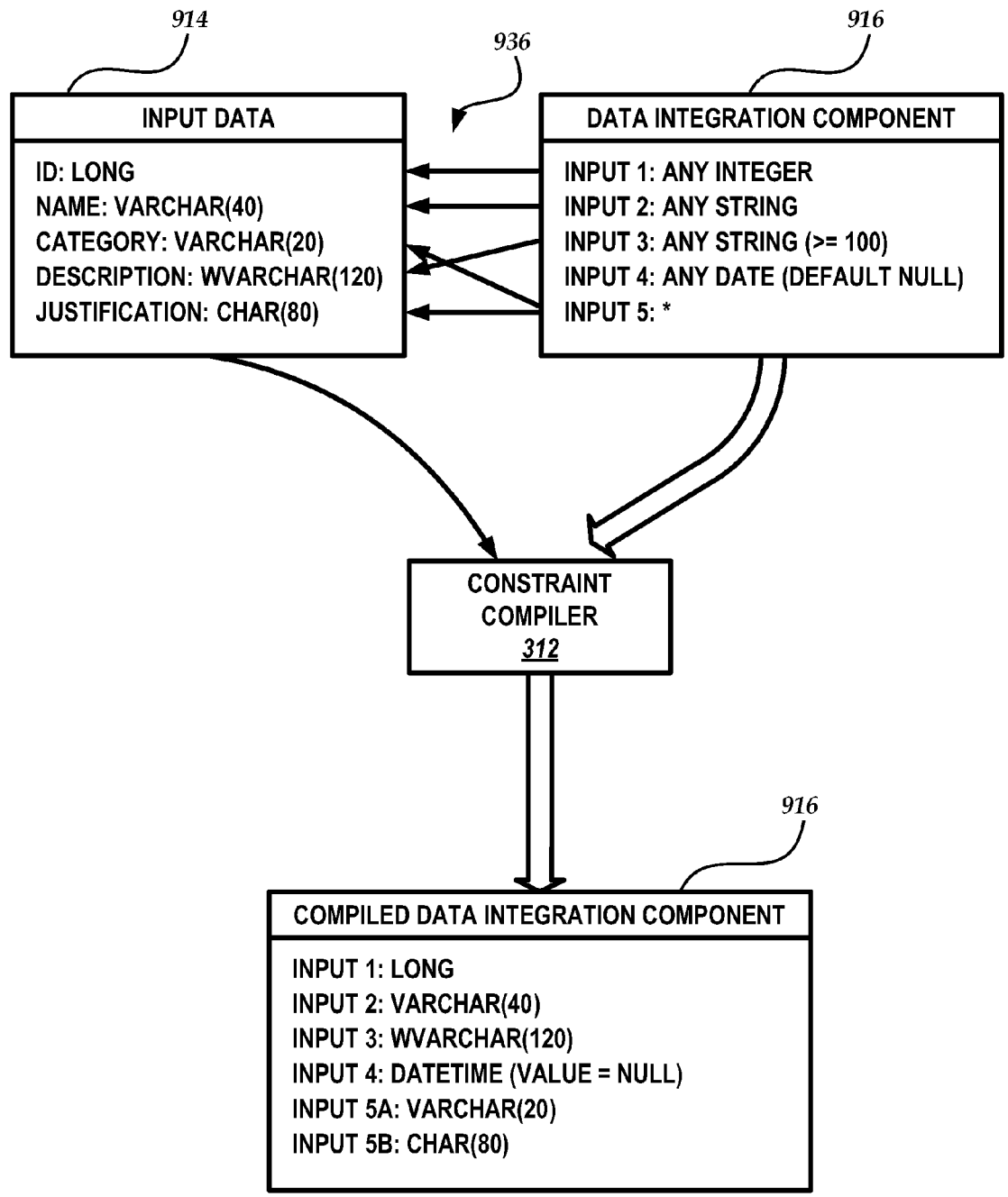

FIGS. 9A-B illustrate examples of mappings 900 between constraint specifications and physical input sources. These examples illustrate mapping and compilation mechanisms described herein.

Table 904 shows constraint specifications for an example data integration component. The specifications include three column references: "input1," "input2," and "input3," having respective data type constraints of Integer, String, and String >=100. Table 902 shows actual data types for three columns of an input data source. The three columns, "ID," "Name," and "Description," map to the data integration component column references "input1," "input2," and "input3," respectively. Arrows 930 illustrate an example mapping. The data types of the input columns are valid with respect to the constraints of the data integration component.

Table 906 shows modified actual data types of an input data source. The modification may be due to a change in the input data source, use of a different data source as the input data source, an intermediate change in a dataflow, or another change in the environment. As compared with table 902, table 906 includes an additional column named "Category" inserted in the third position, before the column named "Description."

Table 908 shows identical constraint specifications as table 904. Arrows 932 show a mapping between the column references of table 908 and the column references of table 906. As illustrated, column "input3" continues to be mapped to column "Description" as in the original mapping between table 902 and table 904. As discussed herein, a robust mapping mechanism, such as use of column names, an internal map, or specifications from a user may enable the system to maintain a correct column mapping after input data source columns change.

Table 910 shows another change in input data. As compared with the input data of table 902, the input data of table 910 includes an additional column, "Category," similar to table 906. Arrows 934 show a preservation of the original mapping, in a manner similar to that illustrated by arrows 932. Table 910 further shows a change in the actual type of the column "Name." In table 910, the data type is a VarChar (40), indicating a length of 40. In table 902, the data type of "Name" is a VarChar (30). Thus, the size of this field has increased. As illustrated by table 912, the constraint for the corresponding column of the data integration component is "any String," which can accommodate a VarChar (30) column. The use of constraints thus enables at least some changes in input data types, as illustrated.

FIG. 9B illustrates another example of a mapping mechanism. As shown in table 916, a data integration component includes column references of "input1," "input2," and "input3," having respective data type constraints of Integer, String, and String >=100. A column reference of "input4" has a corresponding constraint of "any date" with a default value of NULL. Another column reference of "input5" has a corresponding constraint of "*."

In one embodiment, a constraint may specify that a column is optional, and may therefore be omitted from an input source. The constraint may specify a default value, to be used in a configuration in which the column is omitted. The constraint for "input 4" of table 916 provides an example of such a specification, though various implementations may use other formats or ways of specifying a default column or a default value.

In one embodiment, a data integration component may provide a mechanism for adding one or more new columns, referred to herein as prototype columns. In one implementation, one or more prototype columns are specified by an asterisk, though the specification mechanism may vary. When validating actual data types and when compiling a dataflow, an actual column set may correspond to the prototype column, with the actual types inserted. As indicated by arrows 936, in the example of FIG. 9B, the prototype column "input5" is mapped to the columns "Category" and "Justification."

Table 916 shows an example of actual column types that may be generated as a result of compiling the constraints of table 914 based on the data types of an input data source, as shown in table 912. In one implementation, the compilation may be performed or controlled by constraint compiler 312 of FIG. 3.

As illustrated, each column constraint of table 914 has one or more columns with actual data types in table 916. Column "input1" has an actual data type of Long; column "input2" has an actual data type of VarChar(40); column "input3" has an actual data type of WVarChar(120). Each of these data types matches the corresponding data type from the input source as shown in table 912.

The specified actual column "input4" has an actual type of DateTime, with a value of NULL, as specified by the constraint of table 914. This value is provided because the input data source omitted a corresponding column. In an environment in which the input data source has a corresponding column, the values of the column would be received as input.

The prototype column constraint of "input5" is transformed into two column specifications, to match the corresponding input columns. Thus, "input5a" receives an actual type of VarChar (20), received from the "Category" column of table 912; "input5b" receives an actual type of Char (80), received from the "Justification" column.

It is to be noted that a compiled set of actual types based on a different input source may vary considerably. As illustrated in FIG. 3 and discussed herein, the compiled column types may be used to generate an execution plan and to execute each pipeline in an efficient manner.

Figure 10:
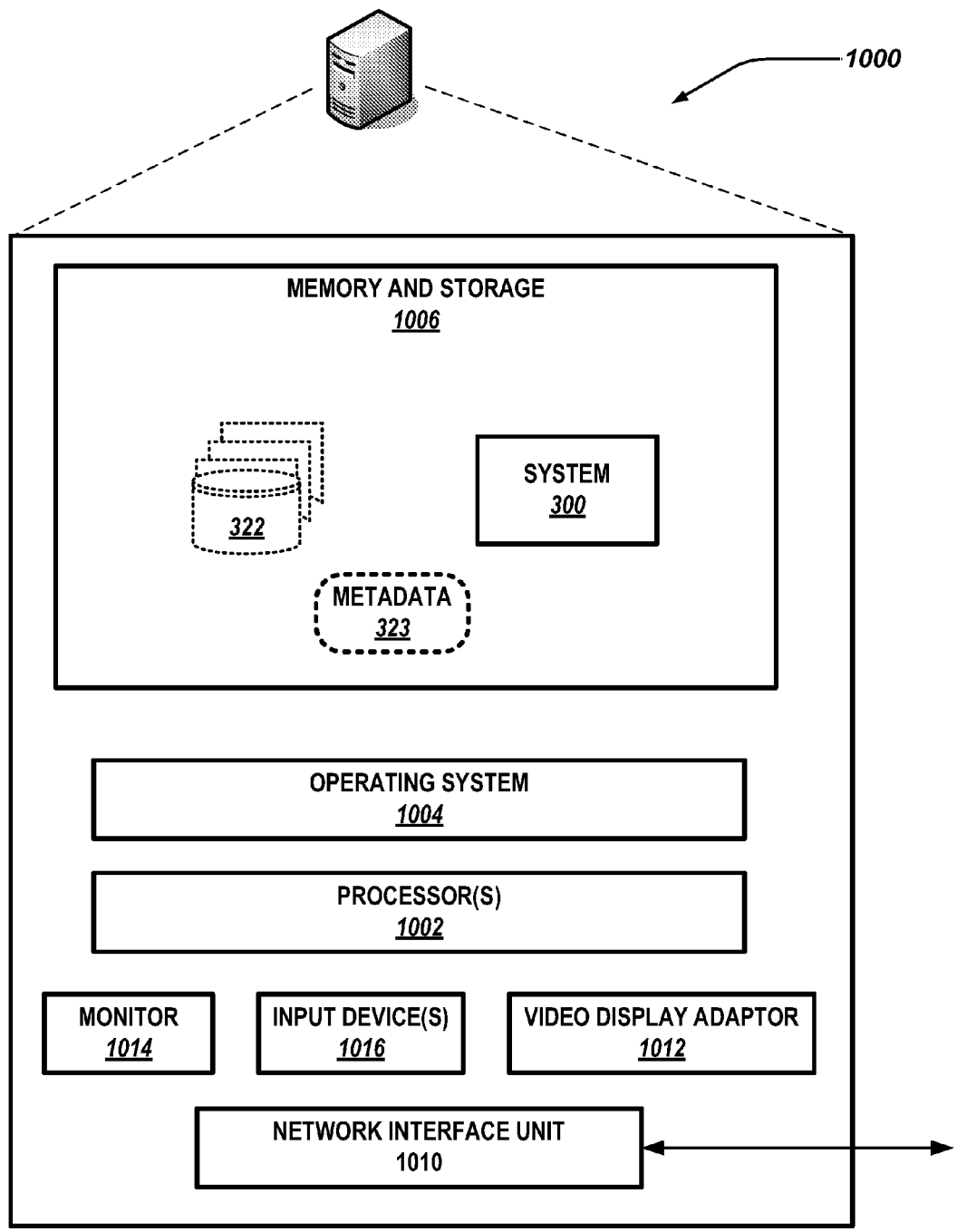
FIG. 10 is a block diagram showing one embodiment of a computing device, illustrating selected components of a computing device that may be used to perform functions described herein.

FIG. 10 is a block diagram showing one embodiment of a computing device 1000, illustrating selected components of a computing device that may be used to implement system 300 or perform functions described herein, including processes 400, 500, 600, 700, or 800. Computing device 1000 may include many more components than those shown, or may include less than all of those illustrated. Computing device 1000 may be a standalone computing device or part of an integrated system, such as a blade in a chassis with one or more blades.

As illustrated, computing device 1000 includes one or more processors 1002, which perform actions to execute instructions of various computer programs. In one configuration, each processor 1002 may include one or more central processing units, one or more processor cores, one or more ASICs, cache memory, or other hardware processing components and related program logic. As illustrated, computing device 1000 includes an operating system 1004. Operating system 1004 may be a general purpose or special purpose operating system. The Windows® family of operating systems, by Microsoft Corporation, of Redmond, Wash., are examples of operating systems that may execute on computing device 1000.

Memory and storage 1006 may include one or more of a variety of types of non-transitory computer storage media, including volatile or non-volatile memory, RAM, ROM, solid-state memory, disk drives, optical storage that can be used to store digital information.

Memory and storage 1006 may store one or more components described herein or other components. In one embodiment, memory and storage 1006 stores the software components of system 300, or a portion thereof. Memory and storage 1006 may store input source 322, metadata 323, or a portion thereof. Any one or more of these components may be moved to different locations in RAM, non-volatile memory, or between RAM and non-volatile memory by operating system 1004 or other components.

Computing device 1000 may include a video display adapter 1012 that facilitates display of program code or other information to a user. Though not illustrated in FIG. 10, computing device 1000 may include a basic input/output system (BIOS), and associated components. Computing device 1000 may also include a network interface unit 1010 for communicating with a network. Software components of system 200 or 300 may be received via transitory media and network interface unit 1010. Computing device 1000 may include one or more display monitors 1014. Embodiments of computing device 1000 may include one or more input devices 1016, such as a keyboard, pointing device, audio component, microphone, voice recognition component, or other input/output mechanisms.

It will be understood that each block of the flowchart illustration of FIGS. 4-8, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-based method of transforming an input set of input data columns from an input source into an output set of output data columns, the method comprising:
   a) receiving a schema contract comprising one or more constraints corresponding to the input set, the schema contract including a specification of a prototype column, wherein the prototype column is specified by a placeholder representing a variable number of output data columns, and is configured to add at least one new column set to the output set of output data columns;
   b) receiving metadata descriptive of the set of input data columns, the metadata including type definitions corresponding to each input data column;
   c) receiving dataflow configuration data representing one or more dataflows of the input set;
   d) executing, using a processor, each dataflow specified by the dataflow configuration data; and e) prior to receiving data of each dataflow, generating a set of column types, each column type corresponding to a respective input data column associated with the dataflow, based on the metadata and the one or more constraints.

2. The computer-based method of claim 1, the schema contract including data describing a mapping between one or more columns of the input data columns and an associated constraint of the schema contract, further comprising employing the mapping to match each of the input data columns to an input specification of a data integration component.

3. The computer-based method of claim 1, further comprising employing an interface to query one or more data integration components for an output column type definition based on an input column type definition.

4. The computer-based method of claim 1, further comprising employing an interface to perform one or more queries of one or more data integration components for an output column type definition based on an input column type definition; and determining whether the schema contract is valid based on the one or more queries.

5. The computer-based method of claim 1, further comprising allocating one or more memory blocks based on the set of column types; receiving data from the input source; and storing the data from the input source in the one or more memory blocks.

6. The computer-based method of claim 1, further comprising:
   a) receiving an additional set of input data columns from an additional input source;
   b) receiving other metadata descriptive of the additional set of input data columns, the other metadata including one or more column type definitions different from corresponding column type definitions associated with the set of input data columns; and
   c) generating an additional set of column types corresponding to the additional input source, based on the schema contract.

7. The computer-based method of claim 1, the schema contract including a specification of an optional column and a default value corresponding to the optional column, the method further comprising if the optional column is omitted from the input set of data columns, generating a column with data corresponding to the default value.

8. The computer-based method of claim 1, further comprising:
   a) determining one or more columns of the input set of data columns corresponding to the prototype column;
   b) determining a number of columns in the one or more determined columns; and
   c) providing the determined one or more columns as input to a data integration component.

9. The computer-based method of claim 1, further comprising:
   a) performing a design validation of the one or more constraints of the schema contract; and
   b) prior to execution of each dataflow, performing a runtime validation of the type definitions corresponding to each input data column.

10. A computer-based system for facilitating transformation of an input data into output data, the system comprising:
    a) one or more data integration components, each data integration component configured to receive input data columns and to generate output data columns based on the input data columns;
    b) a schema processor configured to receive a schema contract including one or more constraints and column mapping data, and validate the schema contract, the schema contract further including a specification of a prototype column, wherein the prototype column is specified by a placeholder representing a variable number of output data columns, and is configured to add at least one new column set to the output set of output data columns;
    c) a constraint compiler configured to receive the one or more constraints, receive metadata descriptive of data columns from an input source, and generate a set of actual column types, including at least one actual output column type corresponding to the prototype column, for use by the one or more data integration components to transform the input data columns;
    the system configured to employ the schema contract for transforming a first set of input data and transforming a second set of input data, the first set of input data and the second set of input data each having a respective set of input column type specifications that differs from the other set of input column type specifications.

11. The computer-based system of claim 10, the first set of input data having a first number of data columns, the second set of input data having a second number of data columns that differs from the first number of data columns.

12. The computer-based system of claim 10, the constraint compiler configured to employ the column mapping data to match the input data columns with the set of actual column types.

13. The computer-based system of claim 10, the constraint compiler comprising means for validating the schema contract.

14. The computer-based system of claim 10, the constraint compiler configured to validate the schema contract by querying the data integration components.

15. A computer-readable storage medium comprising computer program instructions for facilitating transformation of an input data into output data, the program instructions executable by one or more processors to perform actions including:
    a) receiving a set of one or more column constraints;
    b) receiving metadata descriptive of a set of input columns from an input source, the set of input columns including at least one prototype column, wherein the prototype column is specified by a placeholder representing a variable number of output data columns, and is configured to add at least one new column set to the output set of output data columns;
    c) validating the metadata based on the column constraints;
    d) translating the metadata into a set of actual column types based on the column constraints by mapping each of the set of input columns to a corresponding actual column type based on the column mapping data, the mapping further including matching each of the input data columns to an input specification of one or more data integration components and mapping the prototype column to at least one actual output column; and
    e) providing the actual column types to one or more data integration components to facilitate transforming data received from the input source.

16. The computer-readable storage medium of claim 15, further comprising receiving column mapping data; translating the metadata into a set of actual column types comprising mapping each of the set of input columns to a corresponding actual column type based on the column mapping data.

17. The computer-readable storage medium of claim 15, further comprising enabling the one or more data integration components to transform other data received from another input source, the other data having another set of input columns that differ in type from the set of input columns.

18. The computer-readable storage medium of claim 15, further comprising determining an output data type of a first data integration component based on the metadata and determining validity of the metadata and the set of constraints based on the output data type and an input data type of a second data integration component.

19. The computer-based system of claim 10, wherein the constraint compiler is further configured to:
 a) determine one or more columns of the input set of data columns corresponding to the prototype column;
 b) determine a number of columns in the one or more determined columns; and
 c) provide the determined one or more columns as input to at least one of the one or more data integration components.

20. The computer-readable storage medium of claim 15, wherein the translating the metadata into a set of actual column types further includes:
 a) determining one or more columns of the input set of data columns corresponding to the prototype column;
 b) determining a number of columns in the one or more determined columns; and
 c) providing the determined one or more columns as input to at least one data integration component.

* * * * *